United States Patent [19]

McCloskey et al.

[11] Patent Number: 5,650,470
[45] Date of Patent: Jul. 22, 1997

[54] POLYCARBONATE REDISTRIBUTION USING DIETHYLDIMETHYLAMMONIUM HYDROXIDE AS CATALYST

[75] Inventors: Patrick Joseph McCloskey, Wateryliet, N.Y.; Eric Thomas Gohr, Evansville, Ind.; Timothy Hans Lemmen, Canton, Mich.

[73] Assignee: General Electric Company, Schenectady, N.Y.

[21] Appl. No.: 660,383

[22] Filed: Jun. 7, 1996

[51] Int. Cl.$^6$ .................................................. C08F 283/02
[52] U.S. Cl. .......................... 525/462; 525/469; 528/196; 528/485; 528/486; 528/487; 528/488; 528/490; 528/491; 528/492

[58] Field of Search .................... 525/462, 469; 528/196, 491, 492, 485, 486, 487, 488, 490, 502

[56] References Cited

U.S. PATENT DOCUMENTS 5,414,057  5/1995  Campbell et al. .................. 525/462

*Primary Examiner*—Terressa Mosley
*Attorney, Agent, or Firm*—William H. Pittman

[57] ABSTRACT

Polycarbonate compositions are redistributed by melt equilibration using diethyldimethylammonium hydroxide as the redistribution catalyst. This catalyst affords an odorless polycarbonate product having a very low residual amine level.

8 Claims, No Drawings

POLYCARBONATE REDISTRIBUTION USING DIETHYLDIMETHYLAMMONIUM HYDROXIDE AS CATALYST

BACKGROUND OF THE INVENTION

This invention relates to the redistribution of polycarbonates, and more particularly to a redistribution method which is capable of producing a polycarbonate with a low volatiles level.

Polycarbonates have traditionally been prepared by an interfacial method involving the reaction of a dihydroxyaromatic compound with phosgene, or a melt method in which the phosgene is replaced by a diaryl carbonate. In recent years, however, a redistribution process for use with polycarbonates has been developed. This process, described in U.S. Pat. Nos. 5,414,057 and 5,459,226, comprises heating an already formed polycarbonate in the presence of a redistribution catalyst to produce a polycarbonate with a different, generally lower, molecular weight. The method is highly useful commercially because it permits the preparation from monomeric materials of a single high molecular weight polycarbonate, which may then undergo redistribution to yield a spectrum of lower molecular weight materials which can be custom designed depending on their intended use. A similar method, applicable to polyestercarbonates, is disclosed in copending, commonly owned application Ser. No. 08/373,805.

A broad spectrum of redistribution catalysts is disclosed in 5,414,057. Included are tetraalkylammonium hydroxides, tetraalkylammonium acetates, phosphines such as triphenylphosphine and organometallic compounds. The tetraalkylammonium hydroxides are often preferred because of their availability and particular suitability.

A tetraalkylammonium hydroxide which was initially chosen, by reason of its relatively low cost and its relatively low thermal stability, as particularly suitable was tetraethylammonium hydroxide. Low thermal stability was considered important since decomposition to the corresponding trialkylamine, a relatively volatile material which would be lost during extrusion, would afford a polycarbonate product which was expected to have a relatively low volatiles content. It was found, however, that triethylamine was present in the redistributed polycarbonate in amounts as high as 17 ppm (by weight) under typical plant-scale extrusion conditions. Amine levels on the order of 4 ppm or less, preferably 1 ppm or less, are desired.

It might be expected that the substitution of tetramethylammonium hydroxide, which upon thermal decomposition yields the more volatile trimethylamine, for tetraethylammonium hydroxide might satisfactorily solve this problem. Indeed, it was found that the trimethylamine level of a polycarbonate prepared by redistribution using tetramethylammonium hydroxide as a catalyst was very low, generally less than 500 ppb (0.5 ppm). However, even at this low level the trimethylamine imparts a distinct and unpleasant odor to the polycarbonate, rendering it unsuitable for many customer applications.

Therefore, it remains of importance to perform polycarbonate redistribution under conditions which afford a product of low volatiles content and without a detectable odor.

SUMMARY OF THE INVENTION

The present invention is based on the discovery of a tetraalkylammonium hydroxide which is active as a redistribution catalyst and which, upon thermal decomposition under extrusion conditions, affords a highly volatile amine with insignificant odor. This material is diethyldimethylammonium hydroxide, and its principal decomposition product is ethyldimethylamine.

Accordingly, the invention is a method for redistributing an organic polycarbonate composition comprising melt equilibrating an initial linear or branched organic polycarbonate composition characterized by an initial weight average molecular weight in the presence of a catalytic amount of diethyldimethylammonium hydroxide, under conditions such that a redistributed polycarbonate composition is formed having a weight average molecular weight which is different from the initial molecular weight.

DETAILED DESCRIPTION; PREFERRED EMBODIMENTS

Any linear or branched polycarbonate composition is an acceptable starting material for the method of this invention. Suitable polycarbonate compositions include aromatic and aliphatic polycarbonates.

Preferably, the initial polycarbonate composition is an aromatic polycarbonate. Such polycarbonates typically consist essentially of structural units of the formula:

wherein at least about 60 percent of the total number of R groups are aromatic organic radicals and the balance thereof are aliphatic, alicyclic, or aromatic radicals. More preferably, R is an aromatic organic radical and still more preferably a radical of the formula:

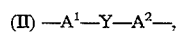

wherein each $A^1$ and $A^2$ is a monocyclic divalent aryl radical and Y is a bridging radical in which one or two carbon atoms separate A1 and $A^2$. Such radicals frequently are derived from dihydroxyaromatic compounds of the formula HO—$A^1$—Y—$A^2$—OH. For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. The most preferred dihydroxyaromatic compound is bisphenol A, in which each of $A^1$ and $A^2$ is p-phenylene and Y is isopropylidene.

Typically, the weight average molecular weight of the initial polycarbonate composition may range from values as low as 500 to values as high as 200,000, as measured by gel permeation chromatography relative to polystyrene. Preferably, the weight average molecular weight of the initial polycarbonate composition ranges from about 5,000 to about 100,000, more preferably, from about 25,000 to about 65,000.

Copolymers, as well as homopolymers, can be redistributed according to the method of this invention. Two or more different dihydroxyaromatic compounds may be employed in the preparation of the copolymer. Alternatively, a copolymer prepared from a mixture of a dihydroxyaromatic compound with a glycol, such as propylene glycol or with a hydroxy- or acid-terminated polyester may be redistributed. Polyestercarbonates, prepared from the reaction of a dihydroxyaromatic compound with the combination of a carbonate source and a dibasic acid such as adipic acid, suberic acid, azelaic acid, 1,12-dodecanedicarboxylic acid and terephthalic acid, may also be redistributed. Further, blends of aromatic polycarbonate homopolymer with any of the above-described copolymers may be employed.

Branched polycarbonates may also be used as the initial composition. Any of the commercially available branched aromatic polycarbonates may be used, such as those disclosed in U.S. Pat. Nos. 3,541,049; 3,799,953; 4,185,009; 4,469,861; and 4,431,793; all of which are incorporated by reference herein in their entirety.

The method of the invention involves melt equilibrating the initial polycarbonate composition in the presence of diethyldimethylammonium hydroxide as a carbonate redistribution catalyst. Melt equilibration involves heating the polymer at a temperature sufficient to produce a melt for a time sufficient to achieve redistribution equilibrium.

Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

Preferably, the method of this invention does not include incorporation into the starting materials of branching agents. Examples of such branching agents are trimellitic anhydride acid chloride, cyanuric chloride and phenolic compounds having two or more hydroxy groups per molecule, for example 1,1,1-tris(4-hydroxyphenyl)ethane. Branching agents of this type will be recognized by those skilled in the art of polycarbonate synthesis and are described in U.S. Pat. Nos. 5,021,521 and 5,097,008. Such branching agents are known to equilibrate with linear aromatic polycarbonate compositions to form branched aromatic polycarbonate compositions.

The amount of redistribution catalyst may be any amount which is effective in promoting the redistribution process. Usually the effective amount will depend upon such parameters as the reaction rate desired, the molecular weight desired in the redistributed composition, and to a lesser extent the chemical nature of the initial polycarbonate composition. Depending upon such variables, an effective amount of catalyst can easily be determined without undue experimentation. The preferred amount is generally in the range of about 15–1000 moles per million moles of carbonate structural units in the initial polycarbonate composition.

It is generally preferred that at least a small proportion of water be present in the redistribution mixture to promote the reaction. This may be achieved by employing an aqueous solution of the diethyldimethylammonium hydroxide, typically a 5–60% solution by weight.

Optionally, a diaryl carbonate may be added to the starting polycarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate may be any amount which provides the desired molecular weight in the redistributed polycarbonate composition. Usually, the amount of diaryl carbonate is no greater than about 1.5% and preferably up to about 1.0% by weight based upon the amount of starting polycarbonate.

The method of this invention can be effected by mixing the starting organic polycarbonate, the carbonate redistribution catalyst (usually in aqueous solution as previously mentioned), and optionally, the diaryl carbonate, and melt equilibrating the resulting mixture at a temperature in the range of about 180°–350° C., preferably about 250°–300° C. Typical melt processing techniques include melt condensation in a Helicone reactor for approximately 5–30 minutes and continuous extrusion through a single screw or twin screw extrusion device. One skilled in the art will recognize that if extrusion is employed, the screw speed and feed rate may vary. During heating, it may be necessary to vent gases formed during decomposition of the catalyst.

It is an advantage of the method of this invention that the molecular weight of the redistributed polycarbonate composition may be controlled to a fine degree. Control is generally obtained simply by varying the amounts of carbonate redistribution catalyst and diaryl carbonate employed in the redistribution process. In such a manner, it is possible to obtain from a single interfacially prepared polycarbonate composition a variety of lower molecular weight redistributed compositions heretofore available only by interfacial polymerization methods.

It is also possible to redistribute a mixture of high and low molecular weight polycarbonates to obtain a polycarbonate of intermediate molecular weight. The latter generally have narrower molecular weight distributions, as represented by dispersivity (Mw/Mn), and lower melt viscosities than simple blends of the high and low molecular weight resins. Mixtures of linear and branched resins may also be redistributed. Finally recycled polycarbonates, as illustrated by the linear optical disk grades and the branched blow molding grades, may be redistributed individually or in admixture; the products have the high ductility of the non-redistributed simple blends as well as other desirable properties.

Another advantage of the method of this invention is that the redistributed polycarbonate compositions exhibit improved melt stability when compared with the interfacially prepared starting polycarbonates. Melt stability can be ascertained by measuring the difference in the molecular weight of a polymer before and after heating in a Tinius-Olsen Extrusion Plastometer. More stable compositions will exhibit less change in molecular weight.

Based on the experimental evidence obtained, it is believed that the principal decomposition product of diethyldimethylammonium hydroxide is ethyldimethylamine, which would typically be produced by elimination of ethylene from the quaternary ammonium hydroxide at elevated temperatures. The level of ethyldimethylamine detected in the polycarbonate product by gas chromatography is substantially less than is true of the triethylamine obtained using tetraethylammonium hydroxide. While the ethyldimethylamine level is higher than that of trimethylamine when tetramethylammonium hydroxide was employed, the ethyldimethylamine which remains is undetectable by odor and its presence in trace amounts is therefore not commercially deleterious.

The invention is illustrated by a series of examples in which a bisphenol A polycarbonate having a molecular weight of 38,000 (all molecular weights herein being weight average, determined by gel permeation chromatography relative to polystyrene), was extruded on a twin-screw extruder within a consistent temperature range including a maximum temperature of 260° C. in the presence of catalytic amounts of four quaternary ammonium hydroxides: diethyldimethylammonium (the present invention), tetramethylammonium, tetraethylammonium and methyltriethylammonium. Each of the redistributed polycarbonates obtained as products had a molecular weight of about 29,500. Other details are given in the following table.

| Identity | Hydroxide Parts per million | | Residual amine, ppm. | Amine odor |
|---|---|---|---|---|
| | Weight* | Mole** | | |
| Diethyldimethylammonium | 120 | 240 | <1.0 | No |
| Methyltriethylammonium | 120 | 210 | 7 | No |
| Tetraethylammonium | 150 | 240 | 14 | No |
| Tetramethylammonium | 115 | 300 | 0.2 | Yes |

*Based on polycarbonate.
**Based on carbonate structural units.

It is apparent from the table that the employment of diethyldimethylammonium hydroxide affords an odorless product having a very low residual amine level, while other ammonium hydroxides afford products with either substantially higher amine levels or a noticeable odor. The variation in amine level is in no way related to the variation in amount of quaternary ammonium hydroxide employed. This is apparent because the variation of catalyst level was only about 25% and there was a 70-fold variation in residual amine level following extrusion.

What is claimed is:

1. A method for redistributing an organic polycarbonate composition comprising melt equilibrating an initial linear or branched organic polycarbonate composition characterized by an initial weight average molecular weight in the presence of a catalytic amount of diethyldimethylammonium hydroxide, under conditions such that a redistributed polycarbonate composition is formed having a weight average molecular weight which is different from the initial molecular weight.

2. A method according to claim 1 wherein the initial polycarbonate composition is a linear aromatic polycarbonate.

3. A method according to claim 2 wherein the aromatic polycarbonate is a bisphenol A polycarbonate.

4. A method according to claim 2 wherein the polycarbonate has a weight average molecular weight in the range of about 500–200,000 as measured by gel permeation chromatography relative to polystyrene.

5. A method according to claim 1 wherein the initial polycarbonate composition is a branched polycarbonate.

6. A method according to claim 1 wherein the initial polycarbonate composition is a polyestercarbonate.

7. A method according to claim 1 wherein the diethyldimethylammonium hydroxide is present in the amount of about 15–1000 moles per million moles of carbonate structural units in the initial polycarbonate composition.

8. A method according to claim 1 wherein the melt equilibration temperature is in the range of about 180°–350° C.

* * * * *